W. T. FULLER.
DEVICE FOR INJECTING STEAM AND WATER INTO ENGINE CYLINDERS.
APPLICATION FILED AUG. 6, 1917.
1,286,578.
Patented Dec. 3, 1918.
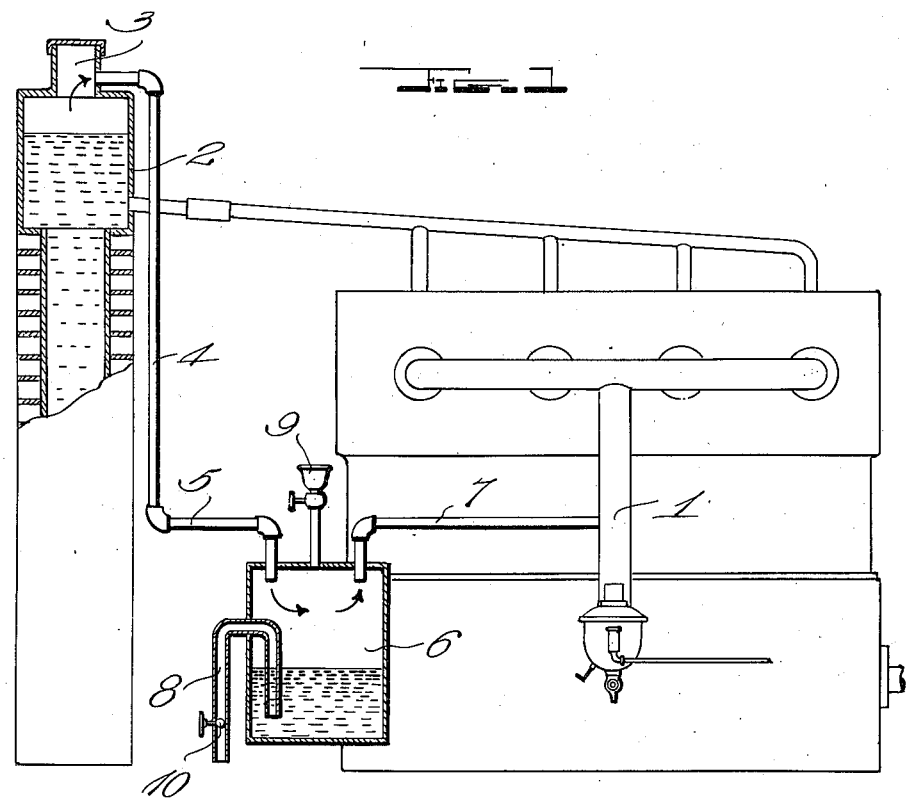
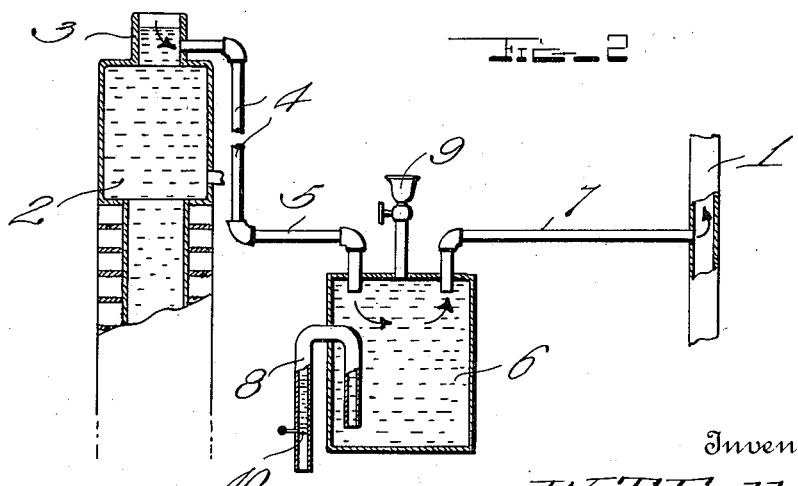
Witness
Inventor
W. T. Fuller
By
Attorneys

UNITED STATES PATENT OFFICE.

WILLIAM T. FULLER, OF SUFFOLK, VIRGINIA.

DEVICE FOR INJECTING STEAM AND WATER INTO ENGINE-CYLINDERS.

1,286,578.  Specification of Letters Patent.  Patented Dec. 3, 1918.

Application filed August 6, 1917. Serial No. 184,706.

*To all whom it may concern:*

Be it known that I, WILLIAM T. FULLER, a citizen of the United States, residing at Suffolk, in the county of Nansemond and State of Virginia, have invented certain new and useful Improvements in Devices for Injecting Steam and Water into Engine-Cylinders; and I do declare the following to be a full, clear, and exact description of the invention, such as will enable others skilled in the art to which it appertains to make and use the same.

This invention relates to certain new and useful improvements in a device for injecting steam and water into the cylinders of an internal combustion engine, used more particularly in connection with motor driven vehicles.

The primary object of the invention is to aid the efficiency of the engine by injecting steam into the cylinders of the same drawn from the radiator of the engine, such steam being first conveyed to a closed tank and the water of condensation being collected and removed therefrom.

Another object of the invention is to provide a device which in addition to the above object, may be used to flush the cylinders of the engine with water, so as to clean them and prevent them from becoming caked with carbon.

A further object of the invention is to provide a device which may also be used to supply kerosene to the cylinders of the engine, thereby greatly increasing the efficiency of the same.

A still further object of the invention is to generally improve upon devices of the same or a similar character by the provision of a simple, durable, and inexpensive construction, and a device which will be efficient and reliable in operation, and well adapted to the purpose for which it is designed.

With these and numerous other objects in view, the invention consists of certain novel features of construction, and the combination and arrangements of parts as will be hereinafter fully described and claimed.

In the accompanying drawings, in which similar reference characters are used to designate like parts throughout the several views;

Figure 1 is a diagrammatic view of a device constructed in accordance with the present invention, showing the same applied to the internal combustion engine and radiator of a motor driven vehicle, and being used to inject steam into the manifold of the engine; and, Fig. 2 is a similar view showing the device used to flush the cylinders of the engine with water.

Referring more particularly to the drawings, especially to Fig. 1, an internal combustion engine used in connection with a motor driven vehicle is shown. This engine among its various parts is provided with the usual intake manifold 1 and a water cooling radiator 2, the latter having a filler neck 3 at its upper end to which is connected in the usual manner a downwardly extending overflow tube or pipe 4.

Connected to the lower end of the overflow pipe 4 in any convenient manner is a flexible pipe line or tubing 5 which leads to a tank or reservoir 6 arranged in a convenient location within the vehicle. This tank 6 is closed, the pipe 5 entering it from the top and extending only a very slight distance downwardly into the same. Similarly arranged and fixed to the tank 6 is an outlet pipe 7 which is likewise preferably made of flexible steel tubing, and which communicates at its other end with the intake manifold 1. It is to be here noted that the manifold 1 has to be tapped in order to afford this connection.

The reference numeral 8 designates a siphon, one leg of which is disposed within the interior while the other leg is disposed on the exterior of the tank 6. As clearly shown by Fig. 2 of the drawings, the lower ends of the legs of the siphon 8 are disposed near the bottom of the tank, while the portion connecting their upper ends passes through the tank at a plane spaced a short distance below the lower ends of the pipes 5 and 7. By this construction it may be seen that whenever the tank 6 becomes filled with water and such water gradually rises, the leg of the siphon arranged within the tank becomes filled until the water will pass around the portion of the siphon connecting its legs and down the leg on the exterior of the tank, and thus cause an automatic setting of the siphon into operation to drain the tank of the water collected therein.

In the ordinary use of a device constructed in the above manner in connection with an internal combustion engine, the radiator 2 is filled in the usual manner, and after the engine has been running for a while, the water in the radiator will become hot so that a considerable quantity of steam will collect in the upper end of the same. This steam will pass through the overflow pipe 4, the pipe line 5 and the tank 6 and thence it will be conveyed by the pipe 7 to the intake manifold 1. Here it will mix with the carbureted fuel which is also being fed into the manifold, and produce a highly efficient mixture for the engine. In case a considerable quantity of steam is condensed in the tank 6 before it passes into the pipe 7, the water of condensation will never rise to such a height that it will interfere with either of the pipes 5 and 7, because of the siphon 8. The automatic action of this has just been explained.

Should it be desired to inject kerosene into the manifold 1, a quantity of such liquid is poured through a valved inlet 9 arranged in the top of the tank, and when within the latter, as steam is supplied to said tank, it will be vaporized and pass with such steam into the manifold 1 through the pipe 7.

It is well known that considerable trouble is experienced because of the fact that the cylinders of the engine become caked with particles of carbon. It oftentimes becomes necessary to wash the cylinders or scrape them to clean them of such carbon, and such a job requires time and labor and sometimes without much beneficial results. These difficulties may be overcome, as shown in Fig. 2, by closing the siphon 8 of the present invention by means of a valve 10 arranged in the leg on the exterior of the tank, and pouring water into the radiator 2 through the filler neck 3 and maintaining the surface of the water above the upper end of the pipe 4. As this water is continuously poured, the radiator overflows through pipe 4, and the tank 6 will become filled and water will be conveyed to the manifold 1 through the pipe 7. It is to be understood that the engine is in motion while the engine cylinders are thus flushed, so that, by means of the suction through the manifold 1, the water will be sprayed into the cylinders and an effective flushing of the same will consequently take place. It will also be seen that a continuous supply of water must be fed to the radiator in order that this result may be accomplished.

From the foregoing description, taken in connection with the accompanying drawings, the construction, use and operation of the device will be readily understood without a more extended explanation. It will also be seen that the objects of the invention have been effectively carried out as a device for injecting steam, kerosene and water into the cylinders of an internal combustion engine has been provided.

As various changes in form, proportion, and in the minor details of construction may be resorted to without departing from the spirit of this invention, I do not wish to be limited to the construction herein shown and described, other than as claimed.

I claim:—

1. In an automobile comprising an engine, a water-cooling radiator therefor, and a manifold; the combination of a closed tank, a tubular connection between the upper end of the radiator and the upper end of the closed tank, a tubular connection between the manifold and the upper end of the closed tank and in open communication with the first said tubular element through said closed tank, a siphon extending through said tank at a level below the level of the ends of said tubular connection in said tank, and means for closing the siphon, whereby either steam or water may be passed from said radiator to said engine substantially in the manner specified.

2. In an automobile comprising an engine, a water-cooling radiator therefor, and a manifold; the combination of a closed tank, a tubular connection between the upper end of the radiator and the upper end of the closed tank, a tubular connection between the manifold and the upper end of the closed tank and in open communication with the first said tubular connection through said closed tank, a siphon extending through said tank at a level below the level of the ends of said tubular connection in said tank, means for closing the siphon, and a valved inlet at the top of said tank, whereby either water or a mixture of oil-vapor and water-vapor may be passed into said engine substantially in the manner specified.

In testimony whereof I have hereunto set my hand in the presence of two subscribing witnesses.

WILLIAM T. FULLER.

Witnesses:
WILEY H. CROCKER,
L. A. FULLER.